Aug. 4, 1936.  S. PITT  2,049,861
MACHINE CONTROL
Filed Dec. 5, 1934  3 Sheets-Sheet 1

INVENTOR
SAMUEL PITT
BY Henry M. Wolfson
ATTORNEY

Aug. 4, 1936.  S. PITT  2,049,861
MACHINE CONTROL
Filed Dec. 5, 1934  3 Sheets-Sheet 3
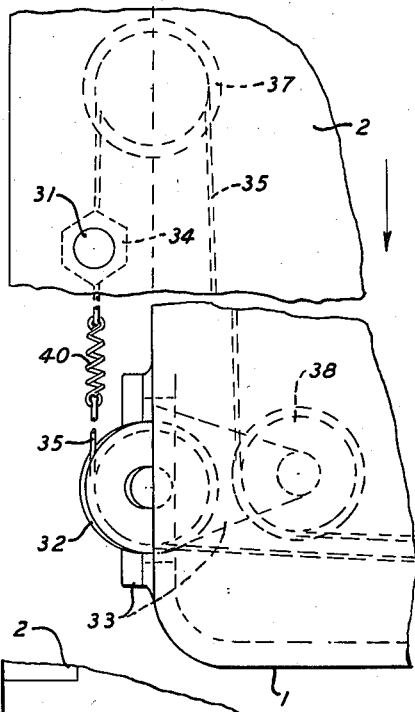
FIG. 3.
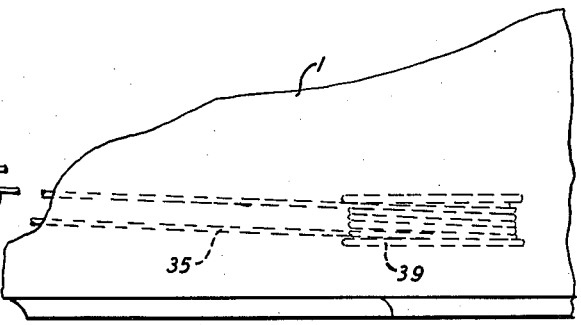
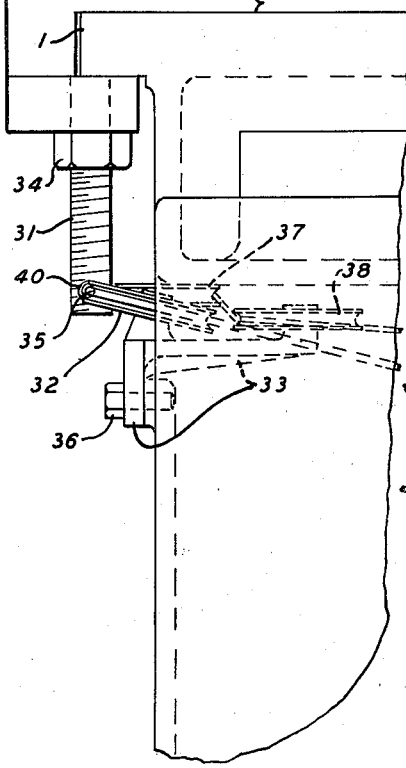
FIG. 4.
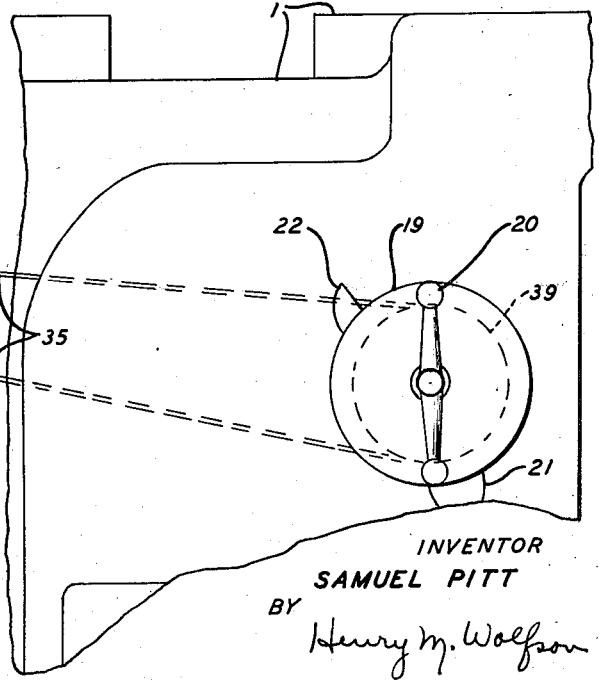
INVENTOR
SAMUEL PITT
BY
Henry M. Wolfson
ATTORNEY Patented Aug. 4, 1936

2,049,861

UNITED STATES PATENT OFFICE 2,049,861

MACHINE CONTROL

Samuel Pitt, Westfield, N. J., assignor to Arthur L. Boyer, Maplewood, N. J.

Application December 5, 1934, Serial No. 756,113

9 Claims. (Cl. 29—69)

I have invented a machine control in which the movement of the tool carriage is transmitted to a control drum in such manner as to provide a motion in said drum which is proportionate to the tool carriage movement and which drum movement may be utilized to in turn control the motion of the tool carriage.

One object of my invention is to furnish a cheap and efficient means, unrestricted as to location, of controlling the approach and withdrawal of a tool to and from a piece of work for performing machine operations on various materials. Another object of my invention is to furnish such a control as may be most conveniently located in a machine, for ease of adjustment and ready accessibility. Other objects will appear from a study of the appended drawings in which—

Figure 3 is a partial plan view of said machine showing an enlarged view of the details of my invention which is part of said machine, and—

Figure 4 is a partial front elevation of said machine showing an enlarged view of my invention.

Like numerals designate like details in all views.

Figure 1:
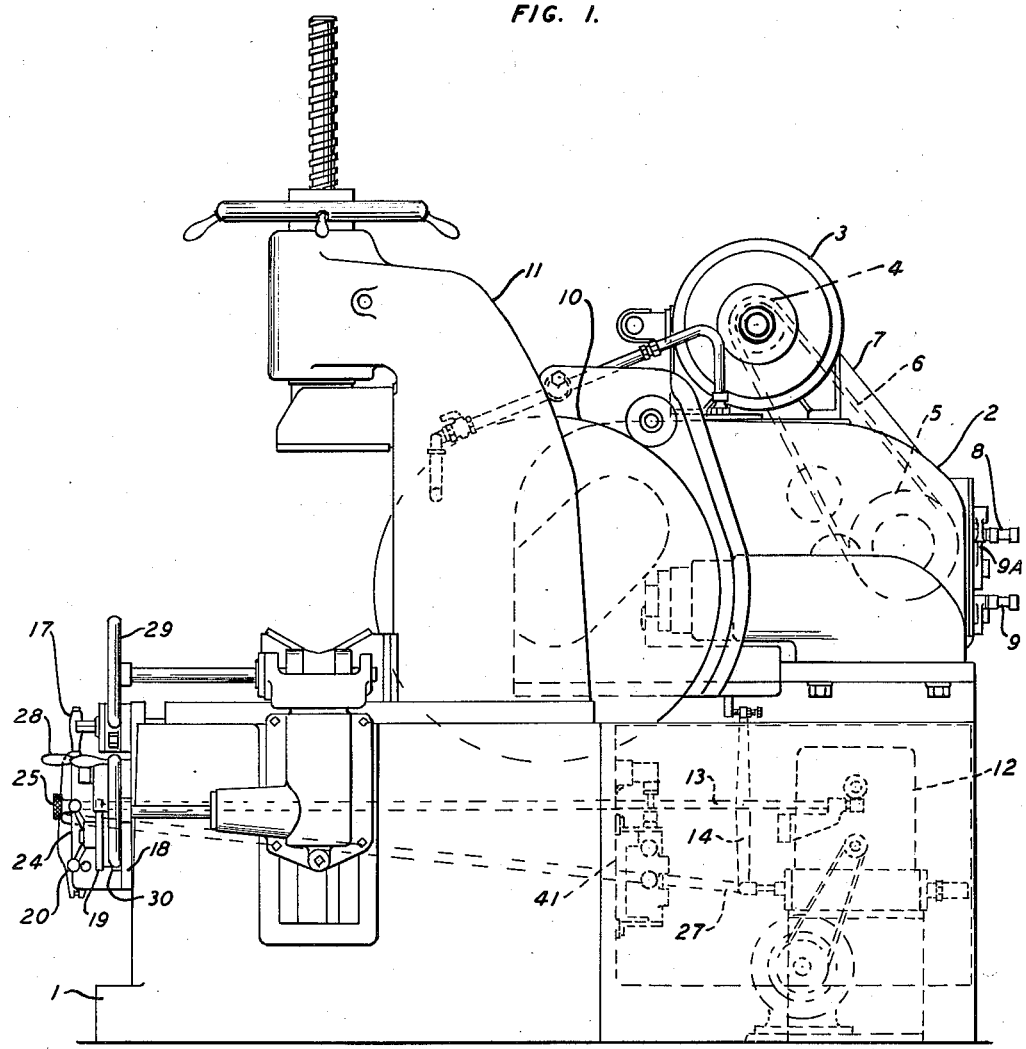
Figure 1 is a side elevation of a metal cutting machine.

Referring to the drawings of the metal cutting machine, hereto appended, 1 is the bed of the machine; 2 is the main carriage on which are mounted driving motor 3, pulleys 4 and 5, belt 6, protective cover 7, speed controls 8, 9 and 9A, and a tool 10, here shown as a circular saw. Inside of carriage 2 are various tool driving gears, the selective meshing of which is accomplished by the operation of controls 8, 9 and 9A, which thereby determine the speed of saw blade 10 in a well known manner. The carriage disclosed is of a construction common to many familiar types of machines and operates to move the cutting tool to and from the work in the usual manner. 11 is a work clamp. Clamp 11 and carriage 2 are both hydraulically operated by pump 12 controlled by means of shaft 13 and lever 14 and other means not here shown which are not necessary to a disclosure of my invention. 15 and 16 are the ordinary electric controls for the motors used in the operation of the machine. 17 is the main lever for starting and stopping of the movements of the tool carriage 2. 18 is the panel on which are mounted the means for controlling the tool travel. Elements 19, 20, 21, and 22 control the tool movement and constitute part of my invention. Their function and operation will be further described in detail. 23 is part of a machine tool control mechanism contained in housing 24. This mechanism is of a construction and design common in the machine art and is connected to pump 12 by means of a pitman 27 which controls the flow of oil from the pump to produce the forward or return movements of the tool carriage 2. Detail 25 is a handle which is connected to pump 12 by means of shaft 13 and is employed to regulate the rate of tool carriage movement by adjusting the volume of oil delivered by the pump, during that portion of the cycle when work is being done.

Disc 26 is geared to handle 25 and is suitably graduated in units of linear movement of the tool to permit setting the speed of operation at a predetermined value. 27 is a pitman connecting lever 17 to pump 12 which is automatically adjusted and set by the control mechanism inside of housing 24, or manually by lever 17. 28 is a lever fastened to valve 41 which applies pressure to clamp 11 to lock the work in position and releases the pressure upon the operation of lever 28, unlocking the work. Hand wheel 30 when rotated raises or lowers the work, permitting its movement into or out of the clamp 11 by means of hand wheel 29.

31 is a pin fastened rigidly by means of nut 34 to the underside of carriage 2. Details 32, 37 and 38 are freely rotating pulleys rigidly mounted on bed 1, pulleys 32 and 38 being rigidly mounted on said bed by means of bracket 33 and bolt 36. Cable 35 is threaded around pulleys 32, 37 and 38 and drum 39. One end of cable 35 is rigidly fastened to pin 31 and the other end of the cable is resiliently fastened by means of spring 40. Drum 39 is rigidly fastened to disc 19 and both are rotationally free in bed 1.

No details of parts, other than those shown in Figures 3 and 4 are herein disclosed, as such details are not pertinent to the invention. The machine herein disclosed is not claimed as an invention, except as specified in copending application, Serial No. 756,114, filed December 5, 1934, and may be in every characteristic, except as disclosed and claimed in the aforementioned copending application, an ordinary metal cutting machine commonly known in the metal cutting art, and is disclosed only as one type of machine to which the invention claimed herein may be applied.

The operation of the control in the machine disclosed is as follows:—

Figure 2:
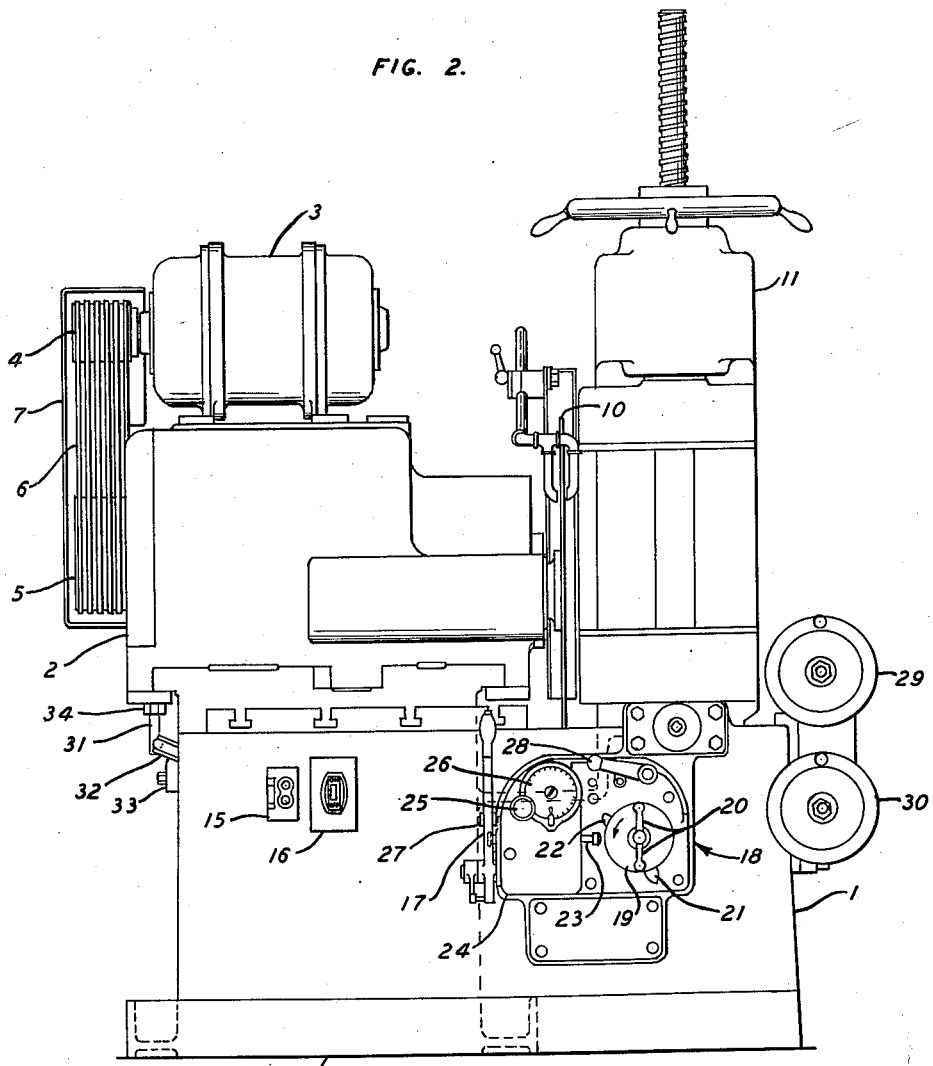
Figure 2 is a front elevation of said machine.

Carriage 2 is started from its rearmost position by the operation of lever 17 which is connected to pump 12 by means of pitman 27. Lever 17 can be controlled manually or by means of a mechanism in housing 24 such as is commonly known to the art. As the carriage moves from its rearmost position in the direction of the arrow in Figure 3, cable 35 is moved with it, causing drum 39 and disc 19 to rotate in the direction of the arrow in Figure 2. Detail 23 at the time lever 17 is operated is thrust forward by a suitable spring not shown, until its end is adjacent to disc 19. This is the position of detail 23 corresponding to a rapid forward movement of carriage 2, bringing saw 10 to the work. As disc 19 is rotated by the motion of carriage 2, cable 35 and drum 39, dog 22 approaches detail 23 and ultimately depresses said detail to the extent of its height. When detail 23 is so depressed, the linkage between the mechanism of housing 24, lever 17, pitman 27 and pump 12, causes carriage 2 to assume the slower operating speed, which speed is predetermined, by setting the amount of oil delivered by the pump by means of elements 25, 26, and 13. Thereafter carriage 2, cable 35, drum 39, disc 19 and dogs 21 and 22 move at the reduced feeding speed until dog 21 further depresses detail 23 to the extent of the height of dog 21 at which point the motion of the carriage is reversed and said carriage travels back to its rearmost position.

Dogs 21 and 22 are rotatably fastened to disc 19 and may be set at any desired point on the circumference of said disc by the operation of locking device 20. Locking device 20 is loosened by rotation on a threaded shaft to which disc 19 and dogs 21 and 22 are fastened. When so loosened, dogs 21 and 22 are also released and permit the operator to set them at any desired point of the circumference of disc 19. Locking device 20 is then tightened and dogs 21 and 22 are thereby locked in position.

Cable 35 is fastened to drum 39 to prevent slippage thereon. Spring 40 has a tension sufficient to overcome all friction and take up all slack, thereby making cable 35 rigid in effect and giving a motion to drum 39 directly proportionate and related to the motion of carriage 2.

The foregoing detailed description illustrates one embodiment of my invention. It is obvious that other equivalents may be substituted for those details described without departing from the spirit of the invention. For instance, more than two dogs could be used as speed and direction controls. This invention could be used on various machines to control linear, oscillating, or circular movements. Drum 39 and disc 19 could be replaced by a device furnishing a linear motion to replace the rotational motion herein disclosed and described. All these are merely alternative means within the scope and spirit of the invention, as specifically pointed out in, and limited only by the appended claims.

I claim:—

1. In a material working machine characterized by two members thereof being movable relative to each other in a continuously reciprocating motion, an endless cable fastened to one member thereof, threaded through a multiplicity of pulleys and fastened to a movable element on a part of said machine which is stationary relative to the second member thereof, so that the relative motion of said two members is transmitted by means of said cable to the said movable element.

2. In a material working machine characterized by a carriage member and a work holding member movable relative to each other in a continuously reciprocating motion, an endless cable, fastened to the movable member thereof, threaded through a multiplicity of pulleys and fastened to a movable element on a stationary member of said machine, so that the relative motion of said two members is transmitted by means of said cable to the said movable element.

3. In a material working machine characterized by a carriage and a work holding device movable relative to each other in a continuously reciprocating motion, an endless cable, fastened to the movable member thereof, threaded through a multiplicity of pulleys and fastened to a movable element on the bed of said machine, so that the relative motion of said two members is transmitted by means of said cable to the said movable element.

4. In a material working machine characterized by two members thereof being movable relative to each other, an endless cable fastened to one member thereof, threaded through a multiplicity of pulleys and fastened to a movable element on a part of said machine which is stationary relative to the second member thereof, and means for automatically controlling said relative motion, so that the relative motion of said two members is transmitted by means of said cable to the said movable element, and thence to said automatic motion control.

5. In a material working machine characterized by a carriage member and a work holding member movable relative to each other, an endless cable, fastened to the movable member thereof, threaded through a multiplicity of pulleys and fastened to a movable element on a stationary member of said machine, and means for automatically controlling said relative motion, so that the relative motion of said two members is transmitted by means of said cable to the said movable element, and thence to said automatic motion control.

6. In a material working machine characterized by a carriage and a work holding device movable relative to each other, an endless cable, fastened to the movable member thereof, threaded through a multiplicity of pulleys and fastened to a movable element on the bed of said machine, and means for automatically controlling said relative motion, so that the relative motion of said two members is transmitted by means of said cable to the said movable element, and thence to said automatic motion control.

7. In a material working machine characterized by two members thereof being movable relative to each other in a continuously reciprocating motion, an endless cable fastened to one member thereof, threaded through a multiplicity of pulleys and fastened to a movable element on a part of said machine which is stationary relative to the second member thereof, and means for automatically controlling said relative motion, so that the relative motion of said two members is transmitted by means of said cable to the said movable element, and thence to said automatic motion control.

8. In a material working machine characterized by a carriage member and a work holding member movable relative to each other in a continuously reciprocating motion, an endless cable, fastened to the movable member thereof, threaded through a multiplicity of pulleys and fastened to a movable element on a stationary member of said machine, and means for automatically controlling said relative motion, so that the relative motion of said two members is transmitted by means of said cable to the said movable element, and thence to said automatic motion control.

9. In a material working machine characterized by a carriage and a work holding device movable relative to each other in a continuously reciprocating motion, an endless cable, fastened to the movable member thereof, threaded through a multiplicity of pulleys and fastened to a movable element on the bed of said machine, and means for automatically controlling said relative motion, so that the relative motion of said two members is transmitted by means of said cable to the said movable element, and thence to said automatic motion control.

SAMUEL PITT.